Aug. 16, 1949.                C. MODLIN                2,478,976
BACKWATER CONTROLLING DEVICE
Filed May 22, 1947
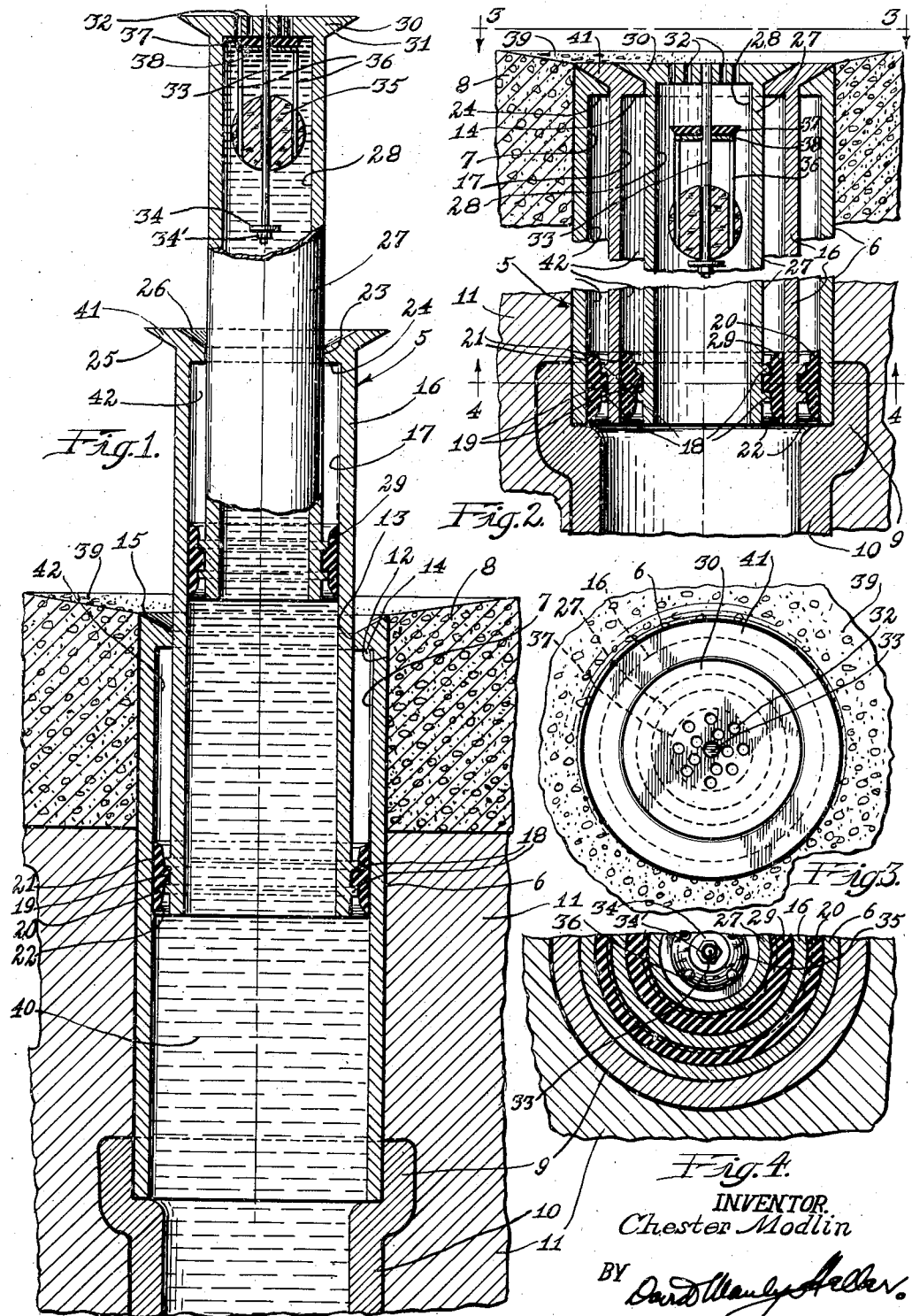
INVENTOR.
Chester Modlin
BY
Attorney Patented Aug. 16, 1949

2,478,976

UNITED STATES PATENT OFFICE 2,478,976

BACKWATER CONTROLLING DEVICE

Chester Modlin, Chicago, Ill.

Application May 22, 1947, Serial No. 749,779

2 Claims. (Cl. 182—25)

My invention relates to floor drains and backwater traps, particularly for basement floors.

An object of my invention is to provide a means for draining water from basements and basement floors.

A further object of my invention is to provide, in a floor drain, a telescoping backwater trap for the purpose of preventing backwater from the sewers of entering the basement and for relieving the pressure against the drain pipes of the said backwater.

A further object of my invention is to provide float valve means that will be caused by the pressure of the backwater from the drain pipes to seal the openings of the drain and, when the backwater pressure has been reduced, will allow the float to drop, opening the drain and thus allowing any water in the basement to escape.

A further object of my invention is to provide a floor drain and backwater trap comprising a number of sections of pipes telescoped together when there is no backwater pressure and capable of being extended upwardly under pressure through the backwater in the drain pipe, thus helping to relieve the pressure of the backwater on the said drain pipe.

A most important object of my invention is to provide, in a floor drain and backwater trap, a number of rubber gaskets, the lower edges of which are feathered. The said gaskets being so attached to the pipe elements that, by means of the feathered edges and the sealing surfaces, they provide a water tight seal between the several sections of the expanded backwater trap when water pressure exists in the drain pipe.

A still further object of my invention is to provide countersunk valve sealing means between the top portions of the respective telescoping pipe sections.

A still further object of my invention is to provide a drain means and backwater trap that may be inexpensively produced and easily attached to any standard sewer drain pipe.

Other objects and advantages inherent in my invention will become readily apparent from the ensuing description and the accompanying drawings, in which like parts are designated by like numerals, and in which:

Fig. 1 represents a cross-sectional view of a section of basement cement floor and the earth beneath and showing a longitudinal section of my invention attached to the flange of a drain pipe.

Fig. 2 represents a cross-sectional view of my invention showing the various cylinders collapsed and telescoped together in their normal position, with the central portion thereof broken away.

Fig. 3 represents a top view of my invention looking in the direction of arrows 3—3 on Fig. 2.

Fig. 4 is a cross-sectional view of my invention taken substantially from line 4—4 on Fig. 2, with a portion thereof broken away.

My invention is generally designated 5. No. 6 represents a metal cylinder having a bore 7 and set with the top end flush with the top of an opening 12 in the cement floor 8. The bottom end of cylinder 6 is sealed into the flange 9 of the drainage pipe 10, set in the earth 11 beneath the basement floor 8. The top end of cylinder 6 has a reduced bore 13 providing a shoulder 14, the top side of which is countersunk at 15. A second metal cylinder 16 fits slidably in the reduced bore 13 of cylinder 6. Cylinder 16 has a bore 17, and on the outside of the cylinder at the bottom, two flanges 18 provide a groove 19 which holds a rubber gasket 20 firmly in place.

Rubber gasket 20 provides a sealing surface 21 against the surface of the bore 7. The bottom edge 22 of the rubber gasket 20 is feathered in order that, when pressure from the backwater 40 exists in the drain, it will seal the edge 22 of the gasket 20. The top of the shoulder 14 is countersunk at 15 to receive the tapered edge 25 of the bottom of extension 41 at the top of the cylinder 16. The cylinder 16 has a bore 17 and is provided at the top with a reduced bore 23 and is countersunk at 26. In its collapsed or telescoped position, the tapered seat 25 fits snugly into the countersunk opening 15 of the cylinder 6.

A second rubber gasket 29 of a smaller circumference is attached to the bottom of a cylinder 27 and provides a sealing surface against the bore 17 in the same manner as described for the rubber gasket 20 on cylinder 16. The cylinder 27 is provided at the top with an extended cap 30, having a tapered bottom seat 31, which in the collapsed or telescoped position fits snugly into the countersunk opening 26 of the cylinder 16 so that, in a collapsed position, the top surface 30 of the cylinder 27 is flush with the top surfaces of the extension 41 of cylinder 16 and the surface 39 of the basement floor 8.

A number of drainage holes 32 are provided in the cap 30 and a shaft 33, having a washer and nut 34 and 34' at its end, is dependently attached to the cap 30. Riding on shaft 33 is a cork float 35 to which is attached, by a number of pins 36, a metal disc 38. Cemented to the disc 38 is a rubber disc gasket 37. When back water pressure exists in the drain pipe 10, the float 35 will be urged upwardly and the rubber disc gasket 37 will be brought into sealing contact with the openings 32 of the cap 30, so that no water may escape therefrom. (See Fig. 1.) When there is no back water pressure in the drain pipe 10, the cylinders 16 and 27 will be in a collapsed or telescoped position, as shown in Fig. 2, with the top 30 flush with the floor surface 39 of the basement. Gravity will maintain the said pipes in this position. Gravity will also keep the cork float 35 and its attached valve 37 in a lowered or open position on the shaft 33, as shown in Fig. 2, thus permitting any water from the basement floor 39 to drain through the openings 32 of the cap 30 and on through the bore 28 into the drain pipe 10 and on into the sewer.

If, however, because of floods or other reasons, water cannot be carried away from the drain 10 and, in trying to find its level, will back into the said drain 10, the backwater 40 will fill the bore 28 of the cylinder 27 and will urge the float 35 and the valve 37 into sealing contact with openings 32 in the top 30. Continuous water pressure will force the cylinders 16 and 27 upwardly as far as the shoulder 24 of cylinder 16 and shoulder 14 of cylinder 6 will permit. Thus, the valve 37 prevents any water escaping through the holes 32 and the rubber gaskets 20 and 29 respectively prevent any water from leaking into the spaces 42 between the said cylinders. The increased capacity provided by the upwardly telescoping of the cylinders 27 and 16 will also serve to relieve the pressure of the backwater 40 in the drain 10 at critical times while allowing none of the water to escape into the basement.

An important sealing action of my invention is effected by the rubber gaskets 20 and 29, the feathered edges 22 of which will be forced, by the pressure of the backwater 40 when it exists, outwardly into a close sealing contact with the surfaces of the bores 7 and 17, thus preventing any water leakage between the cylinders 6, 16, and 27.

Without further elaboration, the foregoing description and exposition will so fully explain my invention that others skilled in the art, by applying current knowledge readily may adapt the source for use under various requirements of service.

Having thus disclosed and revealed my invention, what I claim as new and desire to secure by Letters Patent is:

1. A floor drain comprising, a telescopic structure constructed and arranged to be associated with a floor and normally positioned in collapsed form below the said floor level, and float means secured to the innermost pipe of said telescopic structure, the said float means responsive to reverse flow of drainage to project a portion of the said telescopic structure above the plane of the floor, and annular gasket means for sealing the said multiplicity of telescoping pipe sections interposed between cylindrical surfaces of adjacent telescoping pipe sections, the said float means comprising, a rod secured to the top of said drain, a buoyant element slidably mounted on the said rod, a multiplicity of pins secured to the said buoyant element with free ends projecting upwardly therefrom, and a seal secured to the said pins at the said free ends constructed and arranged to seal the said drain when backwater pressure is increased.

2. A floor drain comprising, a telescopic structure constructed and arranged to be associated with a floor and normally positioned in collapsed form below the said floor level, float means secured to the innermost pipe of said telescopic structure, the said float means responsive to reverse flow of drainage to close initially the said drain and secondarily to project a portion of the said telescopic structure above the plane of the floor, and annular gasket means for sealing the said multiplicity of telescoping pipe sections interposed between cylindrical surfaces of adjacent telescoping pipe sections, the said float means comprising, a rod secured to the top of said drain, a buoyant element slidably mounted on the said rod, a multiplicity of pins secured to the said buoyant element with free ends projecting upwardly therefrom, and a seal secured to the said pins at the said free ends constructed and arranged to seal the said drain when backwater pressure is increased.

CHESTER MODLIN.

REFERENCES CITED

The following references are of record in the file of this patent:

UNITED STATES PATENTS

| Number | Name | Date |
| --- | --- | --- |
| 1,423,679 | Pavitchich | July 25, 1922 |
| 1,457,637 | Sievers | June 5, 1923 |
| 1,982,555 | Van Der Horst | Nov. 27, 1934 |
| 2,049,909 | Kirschner | Aug. 4, 1936 |
| 2,199,675 | Ronning | May 7, 1940 |